United States Patent [19]

Schreurs

[11] 4,148,935

[45] Apr. 10, 1979

[54] METHOD OF MAKING FLUORESCENT LAMP

[75] Inventor: Willy P. Schreurs, Danvers, Mass.

[73] Assignee: GTE Sylvania Incorporated, Danvers, Mass.

[21] Appl. No.: 855,829

[22] Filed: Nov. 30, 1977

[51] Int. Cl.$^2$ .................... B05D 1/36; B05D 5/06; B05D 7/22

[52] U.S. Cl. .................... 427/67; 427/106; 427/157; 427/376 A; 313/221

[58] Field of Search ............ 427/67, 106, 157, 376 A; 313/221

[56] References Cited

U.S. PATENT DOCUMENTS

| | | | |
|---|---|---|---|
| 3,541,377 | 11/1970 | Nagy | 427/67 |
| 3,740,251 | 6/1973 | Repsher | 427/157 |
| 3,984,589 | 10/1976 | van der Wolfe | 427/106 |
| 4,058,639 | 11/1977 | Schreurs | 427/67 |

OTHER PUBLICATIONS

Hawley (Editor), Condensed Chem. Dictionary, 8th Ed., 1971, pp. 423–424.

*Primary Examiner*—Michael F. Esposito
*Attorney, Agent, or Firm*—James Theodosopoulos

[57] ABSTRACT

A coating is deposited on the inner wall of a fluorescent lamp bulb from a suspension of particulate matter in a liquid vehicle of polyoxyethylene, hydroxyethylmethyl cellulose and an insolubilizing agent dissolved in water. After drying and low temperature heating to insolubilize the coating, another coating is deposited thereover from a similar aqueous vehicle.

5 Claims, No Drawings

METHOD OF MAKING FLUORESCENT LAMP

THE INVENTION

This invention is concerned with fluorescent lamps having two or more distinct films on the inner bulb wall. It is usual in the application of such films to heat the lamp, after deposition of the first film, to a high enough temperature to remove organic matter, before deposition of the second film. An example is shown in U.S. Pat. No. 3,987,331 where a coating of $ZrO_2$, deposited with a cellulosic binder, is lehred at 650° C. prior to deposition of a phosphor coating thereover. Another example is shown in U.S. Pat. No. 3,967,153 which discloses the baking of an $Al_2O_3$ coating to remove the organic matter therefrom prior to deposition of a phosphor thereon. U.S. Pat. No. 3,984,589 discloses a fluorescent lamp requiring three separate coatings and three separate lehrings in order to remove the binder after each coating.

U.S. Pat. No. 4,058,639 discloses a method of depositing two successive coatings without the need of lehring after the first coat, because the binder, e.g. nitrocellulose, used in the first coat is insoluble in the liquid vehicle, e.g. water, used in depositing the second coat. But for environmental reasons, it has become desirable to use water as the solvent in all coatings.

This invention discloses a method of depositing two successive particulate coatings each from an aqueous vehicle and without the need of lehring after the first coat. It is accomplished by using water soluble resins which can copolymerize and at least one of which can be made insoluble in water by reaction with an insolubilizing agent upon heating at a low temperature. The resins used are polyoxyethylene and hydroxyethylmethyl cellulose. The latter is insolubilized by incorporating glyoxal, a dialdehyde with only two carbon atoms, in the coating and heating the dried coating at about 85° C. for a short time in order to react the glyoxal with the cellulosic resin. Other insolubilizing agents that were tried, such as polyacrylic acid, urea-formaldahyde resins, phenol, phenolic resins and melamine formaldahyde resins were unsatisfactory because they resulted in poor baking out, low brightness and poor maintenance of the fluorescent lamp.

In a specific example, the polyoxyethylene was dissolved, to form Solution A, by dispersing 104 grams of polyoxyethylene, grade WSRN-3000 from Union Carbide Corporation, in 300 ml isopropanol to which deionized water was added to a total volume of 4000 ml. Solution A contained 2.6 grams of polyoxyethylene per 100 ml of solution.

Solution B was prepared by dissolving in water 68 grams of hydroxyethylmethyl cellulose, Type XD-8186.03 from Dow Chemical Company, and bringing the volume to 4000 ml. The solution contained 1.7 gm of hydroxyethylmethyl cellulose per 100 ml of solution.

Solutions A and B can be individually or jointly purified by the known technique of ion exchange using a strongly cationic resin, such as Dowex 50 or any similar resin in the $H_+$ form. This purification removes the Ca ions present in the polyoxyethylene and the Na ions in the hydroxyethylmethyl cellulose as well as other cationic contaminants. The copolymer used as binder in the coating apparently results from mixing the solutions A and B in suitable proportions, either before or after the ion exchange purification. The proportion of the two polymers is not critical and can range from about ⅓ to 3/1 by weight, the preferred proportion being 1/1. Glyoxal is added to the mixed polymer solution in an amount of about two to three times the dry weight of the hydroxyethylmethyl cellulose and insolubilizes the copolymer when the dried film is subjected to a temperature of about 85° C. for about a minute.

In an energy-saving type of fluorescent lamp, having a transparent conductive film of tin oxide on the inner bulb wall as a starting aid, a protective coating of $Al_2O_3$ was deposited on the tin oxide film from a suspension prepared by mixing 93 ml of Solution A, 117 ml of Solution B, 12.5 ml of a commercially available 40% solution of glyoxal, 250 ml of an $Al_2O_3$ dispersion, and then adding water to a total volume of 1000 ml. The $Al_2O_3$ dispersion was obtained by dispersing 75 grams of submicron size $Al_2O_3$ in 1000 ml water containing 1% acetic acid. The bulbs were coated by down flushing and then dried by a down draft of hot air. At the end of drying, the temperature of the bulbs was increased to about 85° C. and maintained for about one minute.

After cooling, the $Al_2O_3$ film is overcoated with a phosphor water-base coating, using the same coating and drying method. A typical water-base phosphor coating comprises 400 grams of antimony and manganese activated calcium halophosphate dispersed in a vehicle containing 100 ml of Solution A, 68 ml of Solution B and 32 ml of the $Al_2O_3$ dispersion. The pH of the coating is adjusted to 5.0 with a few drops of ammonia. A surfactant, such as a defoamer, can also be added if the coating equipment tends to create bubbles when the coating is deposited on the bulb wall. After the phosphor coating is dried, the bulbs are subjected to the usual lehring for about three minutes at about 650° C. and then processed into finished lamps by methods known in the art.

I claim:

1. In the manufacture of a fluorescent lamp, the steps which comprise: depositing on the inner bulb wall of a fluorescent lamp a first particulate coating from a suspension the liquid vehicle of which comprises polyoxyethylene, hydroxyethylmethyl cellulose and an insolubilizing agent all dissolved in water; drying the coating and then heating it at a low temperature sufficient to insolubilize the coating but insufficient to burn out the organic matter therefrom; depositing on the first particulate coating a second particulate coating from a suspension the liquid vehicle of which comprises polyoxyethylene and hydroxyethylmethyl cellulose dissolved in water; drying the coating; lehring the bulb; and processing the bulb into a finished fluorescent lamp.

2. The method of claim 1 wherein the insolubilizing agent is glyoxal.

3. The method of claim 2 wherein the first particulate coating contains aluminum oxide and the second particulate coating contains a phosphor material.

4. The method of claim 2 wherein the weight ratio of glyoxal to hydroxyethylmethyl cellulose in the liquid vehicle is about two or three to one.

5. The method of claim 1 wherein the weight ratio of polyoxyethylene to hydroxyethylmethyl cellulose in the liquid vehicle is between ⅓ and 3/1.

* * * * *